US006669150B2

(12) United States Patent  
Benoit et al.

(10) Patent No.: US 6,669,150 B2
(45) Date of Patent: Dec. 30, 2003

(54) CLIP ASSEMBLY WITH POSITIVE LOCATING FEATURES

(75) Inventors: Thomas A. Benoit, Bourbannais, IL (US); David A. Shereyk, Homewood, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/082,406

(22) Filed: Feb. 25, 2002

(65) Prior Publication Data

US 2002/0179780 A1 Dec. 5, 2002

Related U.S. Application Data

(60) Provisional application No. 60/294,730, filed on May 31, 2001.

(51) Int. Cl.$^7$ .................................................. F16L 3/08
(52) U.S. Cl. ................... 248/74.2; 248/71; 248/73; 248/74.1; 248/74.3
(58) Field of Search .......................... 248/55, 56, 71, 248/74.2, 74.1, 74.3, 73

(56) References Cited

U.S. PATENT DOCUMENTS

| | | | | | |
|---|---|---|---|---|---|
| 1,671,338 | A | * | 5/1928 | Banks | ............................ 248/55 |
| 3,252,677 | A | * | 5/1966 | Raymond | .................... 248/74.1 |
| 3,576,304 | A | * | 4/1971 | Gillemot et al. | ............... 24/306 |
| 4,490,888 | A | | 1/1985 | Levant | |
| 4,530,478 | A | * | 7/1985 | McClellan | .................... 138/106 |
| 4,572,466 | A | | 2/1986 | Yamaguchi et al. | |
| 4,762,296 | A | | 8/1988 | Kraus et al. | |
| 4,763,132 | A | | 8/1988 | Juds et al. | |
| 4,784,363 | A | * | 11/1988 | Brown et al. | ............... 248/610 |
| 4,795,114 | A | | 1/1989 | Usui et al. | |
| 4,805,479 | A | | 2/1989 | Brightwell | |
| 4,909,462 | A | | 3/1990 | Usui | |
| 4,934,635 | A | * | 6/1990 | Sherman | ........................ 24/279 |
| 4,958,792 | A | | 9/1990 | Rinderer | |
| 4,976,493 | A | * | 12/1990 | Frankila | ....................... 297/410 |
| 4,978,090 | A | * | 12/1990 | Wichert et al. | ........... 248/316.5 |
| 5,009,376 | A | | 4/1991 | Usui | |
| 5,113,717 | A | | 5/1992 | Plamper | |
| 5,209,441 | A | * | 5/1993 | Satoh | ........................... 174/135 |
| 5,301,907 | A | * | 4/1994 | Julian | ........................... 174/135 |
| 5,435,506 | A | * | 7/1995 | Wiley | ......................... 248/74.1 |
| 5,544,849 | A | * | 8/1996 | Peterson et al. | ............. 248/74.1 |
| 5,364,051 | A | | 11/1994 | Philpot | |

(List continued on next page.)

FOREIGN PATENT DOCUMENTS

| | | | | | |
|---|---|---|---|---|---|
| DE | | 508 806 | * | 10/1930 | ................. 248/74.1 |
| DE | | 871 021 | * | 3/1953 | ................. 248/74.1 |

*Primary Examiner*—Leslie A. Braun
*Assistant Examiner*—Amy J. Sterling
(74) *Attorney, Agent, or Firm*—Mark W. Croll; Paul F. Donovan

(57) ABSTRACT

A clip assembly configured for attachment to an axially elongated tubular member in a manner limiting movements of said clip assembly relative to the elongated member is disclosed. The clip assembly includes a hollow sleeve configured to fit about and grippingly engage an outer lengthwise portion of the elongated tubular member and a clip having a fastening portion and an attachment portion. The fastening portion of the clip is configured to attach the clip to a support. The attachment portion of the clip includes first and second sections which combine with each other to define an opening for accommodating and compressing the hollow sleeve therebetween. The sleeve and attachment portion of the clip are provided with cooperating instrumentalities which relate to each other after said sleeve is inserted and compressed between the first and second sections of the attachment portion of the clip to limit movement between the sleeve and clip thereby providing a positive locating feature between the sleeve, the clip, and the elongated member.

21 Claims, 4 Drawing Sheets

U.S. PATENT DOCUMENTS

| | | | |
|---|---|---|---|
| 5,547,152 A | * 8/1996 | Krock | .................. 24/274 WB |
| 5,669,590 A | 9/1997 | Przewodek | |
| 5,765,787 A | 6/1998 | de Beers et al. | |
| 5,967,468 A | 10/1999 | Veghte et al. | |
| 6,062,516 A | 5/2000 | Rizzo et al. | |
| 6,079,673 A | 6/2000 | Cox | |
| 6,398,170 B1 | * 6/2002 | Wada | ........................ 248/74.5 |

* cited by examiner

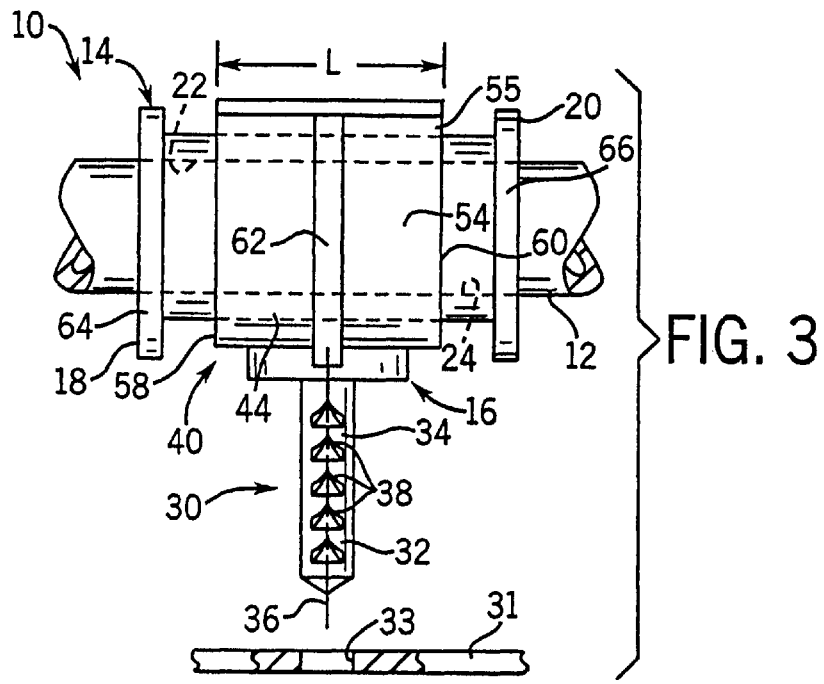
FIG. 3
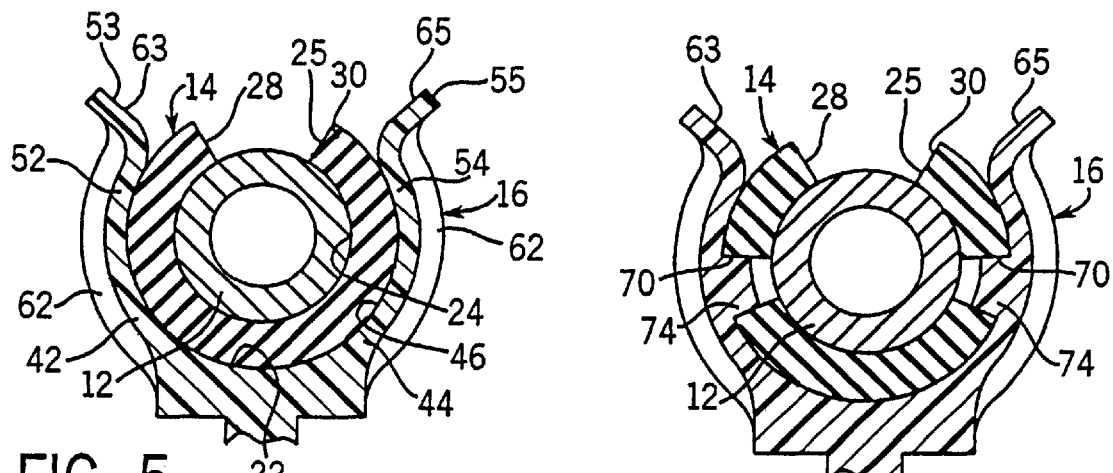
FIG. 5
FIG. 7
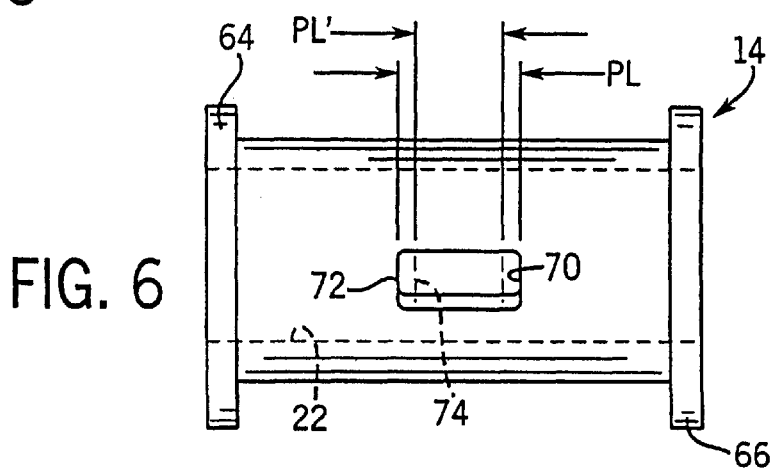
FIG. 6

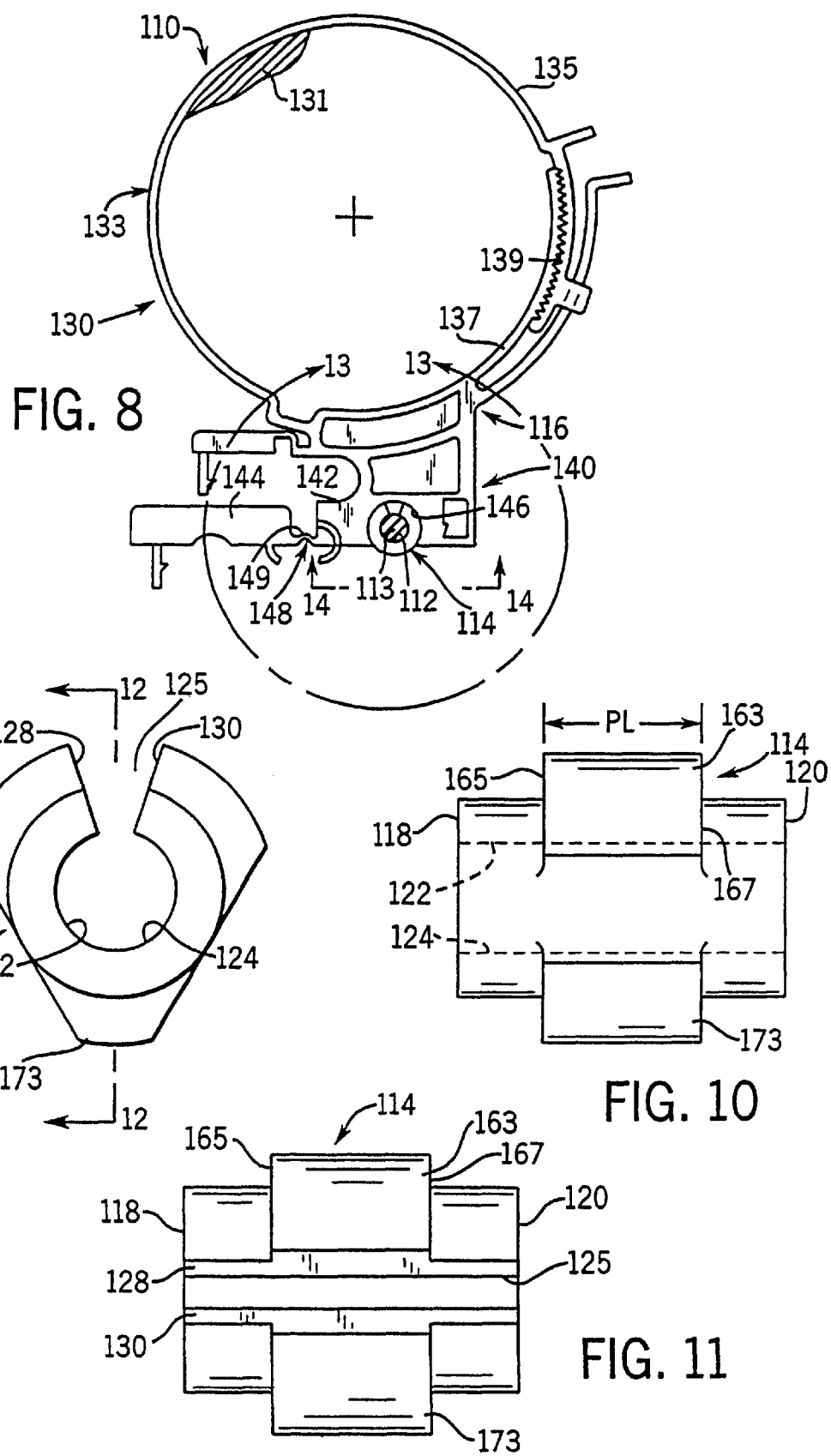

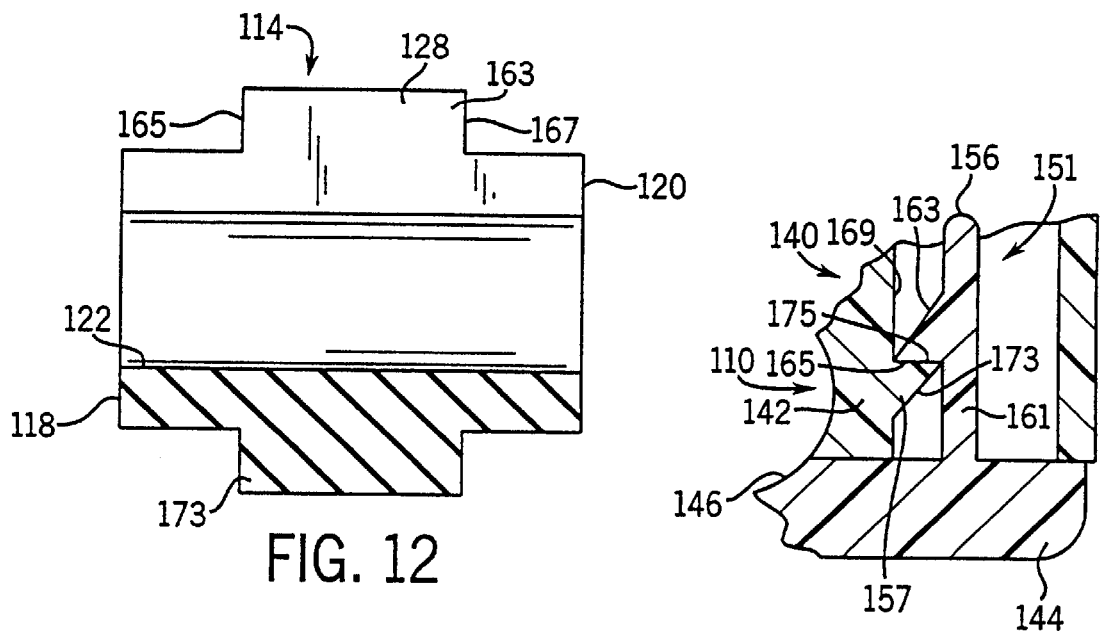
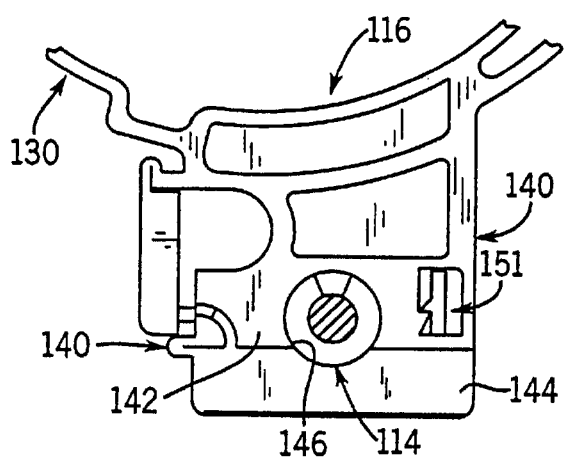
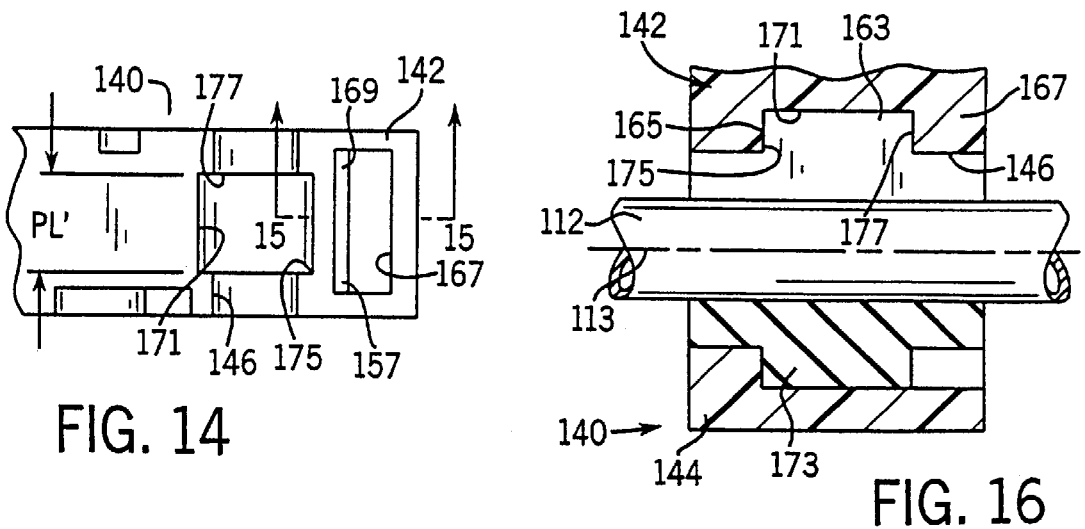

CLIP ASSEMBLY WITH POSITIVE LOCATING FEATURES

This application claims the benefit of provisional application 60/294,730 filed on May 31, 2001.

FIELD OF THE INVENTION

The present application generally relates to a clip assembly and, more particularly, to a clip assembly which is positionable about an elongated tubular member and which is configured to restrict movements of the clip assembly relative to the elongated tubular member.

BACKGROUND OF THE INVENTION

Routing clips are typically attached to brake, fuel lines bundles, cables, or other such elongated tubular members to secure and position the tubular member relative to an adjacent support. Such routing clips are usually precisely secured along the length of the elongated tubular member such that, when the tubular member is installed on a vehicle or the like, a fastening portion of the clip aligns with an attachment location or site on the adjacent support. Typically, however, and due to variations at the assembly plant or misalignments due to shipping and handling, the clips often need to be axially moved along the length of the elongated member to relocate them whereby allowing the clip fastening portion to align with the adjacent support.

For the clip to serve a useful purpose, it should exert a relatively high axial retention force (i.e., 15 lbs. or more} on the tubular member thereby serving to maintain a secure and positive locating feature relative to the elongated member with which the clip is arranged in operable association. As will be appreciated, however, when the clip is designed to exert a relatively high axial retention force (i.e., 15 lbs. or more} on the tubular member, manual relocation of the clip along the length of the tubular member can be difficult. Therefore, and to facilitate assembly operations, plant ergonomics usually limit the axial retention force exerted by the clip on the elongated member to 10 lbs. or less.

When the clip is designed to readily permit relative sliding movement between an attachment portion of the clip and the elongated member secured by the clip attachment portion, then the clip will almost certainly be misaligned relative to the adjacent support when the elongated member is assembled to the vehicle or the like. Research has revealed, clips having attachment portions which exert less than 10 lbs. of holding force on an elongated length of tubular member arranged in operable association therewith often results in the clip rotating and sliding or slipping several inches relative to its original attachment location on the elongated member as a result of shipping and handling of the elongated member.

Tube manufacturers have proposed various manufacturing changes and designs in an attempt to overcome these problems. For example, some tube manufacturers have proposed crimping the tubular lines to establish and maintain a secure and positive locating feature between the clip and the elongated tubular member supported and located by the clip. Besides adding manufacturing costs to the resultant product, crimping of a tubular member or line reduces the cross section of the tubular member and, thus, can adversely affect the fluid flow therethrough. Other tube manufacturers have proposed providing flat areas to achieve the goal of securing and positively locating the clip relative to a lengthwise portion of the elongated member. Again, this proposal prohibitively adds significant costs to manufacturing the tubular member.

Thus, there is a continuing need and desire for a clip assembly which allows endwise movement between an attachment portion of the clip assembly and the elongated member secured and positioned thereby at a relatively low force (i.e., less than 10 lbs.) while also providing a positive locating feature between the clip and the elongated member to facilitate securement of a fastening portion of the clip to an adjacent support.

BRIEF DESCRIPTION OF THE INVENTION

In view of the above, and in accordance with the present invention there is provided a clip assembly configured for attachment to an axially elongated tubular member in a manner limiting movements of the clip assembly relative to said elongated member. The clip assembly of the present invention includes a sleeve configured to fit about and grippingly engage an outer lengthwise portion of the elongated tubular member and a clip having a fastening portion and an attachment portion. The fastening portion of the clip is configured to attach the clip to a support. The attachment portion of the clip includes first and second sections which combine with each other to define an opening for accommodating and compressing the hollow sleeve therebetween.

A salient feature of the present invention relates to providing the sleeve and the clip attachment portion with cooperating instrumentalities which relate to each other after the sleeve is inserted and compressed between the first and second sections of the clip attachment portion. Prior to the cooperating instrumentalities on the sleeve and the attachment portion of the clip being arranged in operable combination relative to each other, the sleeve is easily and readily positionable along the length of the elongated member thereby allowing the clip assembly to be readily moved relative to the elongated member. When arranged in operable combination relative to each other, however, the cooperating instrumentalities on the sleeve and the attachment portion of the clip serve to limit movement between the sleeve and clip thereby providing a positive locating feature between the sleeve, the clip, and the elongated member.

In one form, the sleeve has opposed ends with a predetermined length therebetween. An outer surface of the sleeve is configured between opposed ends to operably combine with a recess defined by the opening between the first and second sections of the clip attachment portion for accommodating the configuration on the outer surface of the sleeve. As will be appreciated, the recess and the configuration on the outer surface of the sleeve are each configured relative to the other to limit movement between the sleeve and the clip after the sleeve is fitted and operably held within the opening on the clip attachment portion thereby providing a positive locating feature between the sleeve, the clip, and the elongated member.

The sleeve defines a circular inner surface which is configured to fit about the elongated member and preferably has an incomplete cross-sectional configuration. As will be appreciated from an understanding of the present invention, the axial retention applied by the sleeve to the elongated member can be varied by changes to the length, the inner and outer profiles, and the material from which the sleeve is formed. In a preferred embodiment, the sleeve is formed from an elastomeric material capable of reducing vibration transfer between the support to which the clip assembly is attached or fastened and the elongated member supported and positioned by the clip assembly. Preferably, the sleeve defines a pair of confronting cam surfaces for facilitating fitting or positioning the sleeve about and along an outer lengthwise portion of the elongated member arranged in operable association with the clip assembly.

The fastening portion of the clip can take any of a myriad of designs. In one form, the clip fastening portion includes a shaft defining a longitudinal axis and anti-retraction ribs disposed along the shaft and extending away from the longitudinal axis for restricting removal of the clip from the support. Alternatively, the clip fastening portion includes a resilient strap having a generally circular configuration with two flexible limbs which are positionable about the support. Each flexible limb preferably includes a series of teeth disposed for interengagement relative to each other whereby permitting the clip to be positioned and secured about the support.

Similarly, the attachment portion of the clip can have multiple configurations and designs. In one form, the first and second sections of the clip are defined by a pair of resilient and free ended arms extending away from the clip fastening portion and which are disposed relative to each other to provide a generally C-shaped configuration to the attachment portion of the clip. With such clip design, the free ended arms terminate in a pair of opposed end portions which are slightly spaced apart from one another. The opposed end portions of the free ended arms define a pair of confronting cam surfaces to facilitate fitting the sleeve therebetween.

Alternatively, the first and second sections of the clip attachment portion are joined together at respective first ends by a hinge. The hinge has an undeformed condition, wherein the first and second sections of the clip attachment portion are in an open position in which second ends of the first and second sections are relatively spaced from each other, and a deformed condition. In the deformed condition, the hinge permits the first and second portions of the clip attachment portion to be brought into a closed position in which the second ends of the first and second sections are relatively closed to each other. Preferably, latch structure is provided for maintaining the first and second hinged sections in closed relationship relative to each other.

Accordingly, a primary object of this invention is to provide a clip assembly which is readily positionable along the length of an elongated tubular member while also providing a positive locating feature between the clip assembly and the elongated member to facilitate securement of a fastening portion of the clip to an adjacent support.

Another object of the present invention is to provide a clip assembly which supports and positions an elongated member relative to a support while providing for quick and easy securement of the clip assembly to the adjacent support.

Yet another object of the present invention is to provide a clip assembly which yields a relatively high axial retention force to the elongated member supported and located thereby while allowing for limited movements of said elongated member relative to the clip assembly.

Still another feature of the present invention relates to the provision of a clip assembly which solves heretofore known clip problems with a simple design and which is economical to manufacture.

These and other objects, aims and advantageous features of the present invention will become more readily apparent from the following detailed description, drawings, and appended claims.

BRIEF DESCRIPTION OF THE DRAWINGS

FIG. 3 is a front elevational view of the clip assembly illustrated in FIG. 1;

FIG. 5 is an enlarged elevational view of one form of hollow sleeve forming part of the clip assembly illustrated in FIG. 1;

FIG. 6 is a sectional view taken along line 6—6 of FIG. 4;

FIG. 7 is an enlarged sectional view taken line 7—7 of FIG. 4;

FIG. 8 is an elevational view of another form of clip assembly which embodies principals according to the present invention;

FIG. 9 is an enlarged end view of another form of hollow sleeve forming part of the clip assembly illustrated in FIG. 1;

FIG. 10 is a front elevational view of the hollow sleeve illustrated in FIG. 9;

FIG. 11 is a top plan view of the hollow sleeve illustrated in FIG. 9;

FIG. 12 is a sectional view taken along line 12—12 of FIG. 9;

FIG. 13 is a fragmentary bottom plan view of the clip assembly taken along line 13—13 of FIG. 8;

FIG. 14 is a fragmentary view similar to FIG. 8 but showing it and second sections forming part of the clip assembly in a closed position relative to each other;

FIG. 15 is a sectional view taken along line 15—15 of FIG. 14 and showing one structure for maintaining the first and second sections of the clip assembly in closed position relative to each other; and FIG. 16 is an enlarged sectional view taken along line 16—16 of FIG. 15.

DETAILED DESCRIPTION OF THE INVENTION

Figure 1:
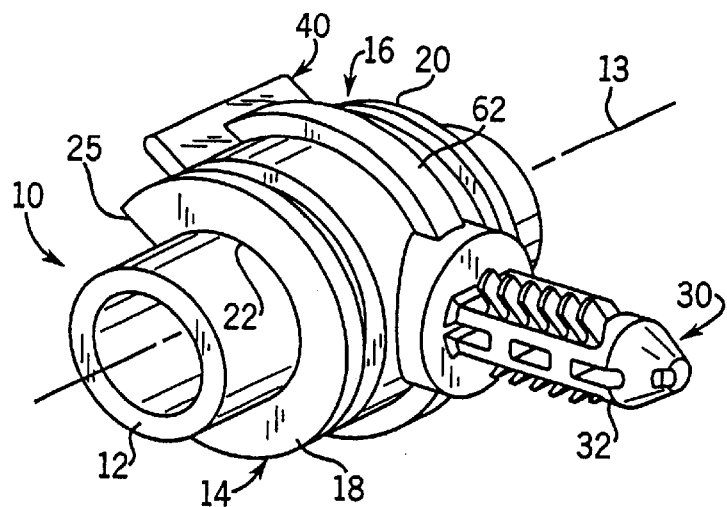
FIG. 1 is a perspective view of one form of a clip assembly embodying principals of the present invention.

While the present invention is susceptible of embodiment in multiple forms, there is shown in the drawings and will hereinafter be described preferred embodiments of the invention, with the understanding the present disclosure is to be considered as setting forth exemplifications of the invention which are not intended to limit the invention to the specific embodiments illustrated and described.

Referring now to the drawings, wherein like reference numerals indicate like parts throughout the several views, there is shown in FIG. 1 one form of clip assembly embodying principals of the present invention and generally identified by reference numeral 10. As shown, the clip assembly 10 is configured for attachment to an axially elongated tubular member 12 defining an elongated axis 13. As used herein, the term or phrase "elongated tubular member" is includes a tube or conduit, a hollow line, a Bowden or other forms of coaxial cable, a wire, a wire harness, a cable bundle, piping, ductwork, or other forms of elongated rod-like articles. Broadly stated, the clip assembly 10 includes sleeve 14 and a clip 16 arranged in operable combination relative to each other.

Figure 2:
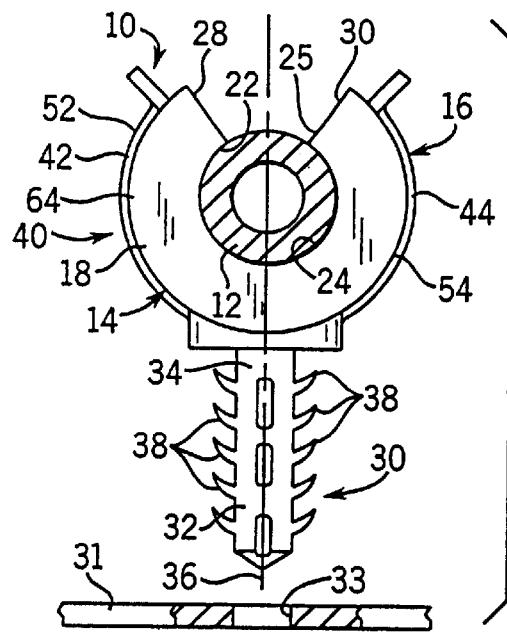
FIG. 2 is an end view of the clip assembly illustrated in FIG. 1.
Figure 4:
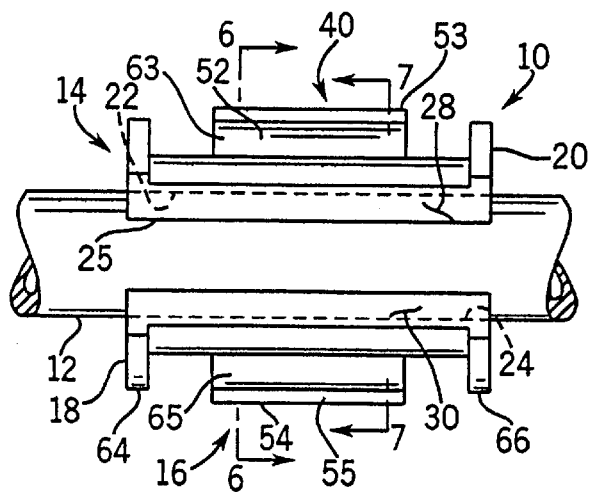
FIG. 4 is a top plan view of the clip assembly illustrated in FIG. 1.

As shown in FIGS. 2 through 4, the sleeve 14 of clip assembly 10 is configured to fit about and grippingly engage an outer lengthwise portion of the elongated member 12. Sleeve 14 is preferably formed from a compressible, elastomeric material such as nylon, rubber, or other forms of composite materials. Sleeve 14 has a predetermined length between its opposed ends 18 and 20. As shown, sleeve 14 includes a bore or opening 22 which opens to the opposite ends 18, 20 and defines an inner surface 24 for sleeve 14. In a preferred form, and to enhance the compressibility of the sleeve 14 about the elongated member 12, the inner surface 24 of sleeve 14 has an incomplete circular cross-section. That is, and to facilitate the gripping engagement of sleeve 14 with the elongated member 12, sleeve 14 preferably defines an open slit or groove 25 extending along the length thereof In a most preferred embodiment, sleeve 14 furthermore defines a pair of confronting cam surfaces 28 and 30 for facilitating fitting sleeve 14 about and along an outer lengthwise portion of the elongated member 12.

The clip 16 of assembly 10 includes a fastening portion 30 and an attachment portion 40. In a preferred embodiment, the fastening portion 30 and attachment portion 40 are formed integral relative to each other. In a most preferred form, the clip 16 is formed from an elastomeric material selected from the class consisting of: plastic, nylon, or other forms of composite materials.

As illustrated in FIGS. 2 and 3, the fastening portion 30 is configured to attach the clip 16 to a fixed support or surface 31 on a vehicle or the like. As shown, the fastening portion 30 of clip 16 preferably includes a conventional push-in retaining element 32 extending away from the attachment portion 40 of the clip 16 for non-removable insertion within an aperture, slit or opening 33 of the support structure or connecting site 31.

Suffice it to say, the push-in element 32 includes an elongated shaft or shank 34 defining an elongated axis 36 and having a plurality of anti-retraction flexible ribs or formations 38 extending along opposite sides of shaft 34 and away from the axis 36. As is known, the ribs or formations 38 on opposed sides of shaft 36 are separated from each other to enable relatively easy deformation of the ribs 38 for insertion of the fastening portion 30 of clip 16 into the opening 33 of the support 31 and yet relatively difficult removal of the fastening portion 30 of clip 16 from the support or connecting site 31.

As illustrated in FIGS. 2 and 5, the attachment portion 40 of clip 16 includes first and second sections 42 and 44, respectively, which combine with each other to define an opening 46 (FIG. 6) for accommodating and compressing the sleeve 14 therebetween. As shown in FIGS. 2 and 5, the first and second sections 42 and 44 of clip attachment portion 40 are configured as resilient and free ended arms 52 and 54 extending away from the clip fastening portion 30 and which are disposed relative to each other to provide a generally C-shape configuration to the clip attachment portion 40. That is, the arms 52 and 54 terminate in a pair of opposed end portions 53 and 55 which are spaced apart from one another thereby allowing the arms 52, 54 to flex outwardly to allow sleeve 14 to pass therebetween and then return inwardly toward each other to apply a compressive force or load on the sleeve 14. In the exemplary embodiment shown in FIG. 3, each arm 52, 54 has a predetermined length L defined between opposed sides 58 and 60. A centralized rib or stiffening member 62 (FIGS. 3 and 5) provided on each am 52, 54 tends to return the respective sections 42, 44 of the clip attachment portion 40 to a non-flexed condition or position after sleeve 14 is passed therebetween.

As illustrated in FIGS. 2 through 5, the end portions 53 and 55 of the flexible arms 52 and 54, respectively, are configured to facilitate insertion of the sleeve 14 therebetween and into the opening 46 of the clip attachment portion 40. More specifically, and as shown, the end portions 53 and 55 of the flexible arms 52 and 54, respectively, are configured with outwardly flared or camming surfaces 63 and 65. Suffice it to say, surfaces 63 and 65 are configured to facilitate sliding movement or passage of the sleeve 14 past the free ends 53 and 55 of arms 52 and 54, respectively, and into or toward the opening 46 of the clip attachment portion 40.

A salient feature of the present invention relates to providing sleeve 14 and clip attachment portion 40 with cooperating instrumentalities which relate relative to each other after the sleeve 14 is inserted and compressed between the first and second sections 42 and 44, respectively, of the clip attachment portion 40 to limit movement of sleeve 14 and clip 16 thereby providing a positive locating feature between elongated member 12, sleeve 14, and clip 16.

One form of the cooperating instrumentalities on the sleeve 14 and the clip attachment portion 40 for positively locating the elongated member 12, the sleeve 14, and the clip 16 relative to each other is shown in FIGS. 3, 4 and 6. As shown, sleeve 14 is furthermore provided with radial flanges 64 and 66 arranged toward the opposed ends 18 and 20 of sleeve 14. Suffice it to say, the linear distance between innermost surfaces of the flanges 64 and 66 is equal to or greater than the predetermined length L between the opposed side surfaces 58 and 60 of the arms 52, 54 of the clip attachment portion 40 and defines a length of travel for the sleeve 14 relative to the clip 16. Accordingly, while sleeve 14 is permitted to traverse such length of travel thereby facilitating securement of the clip fastening portion 30 relative to the support or connecting site 31, the cooperating instrumentalities on the sleeve 14 and clip attachment portion 40 serve to positively locate the elongated member 12, the sleeve 14 and clip 16 relative to each other.

As will be appreciated, the cooperating instrumentalities for positively locating the elongated member 12, sleeve 14 and clip 16 relative to each other can take alternative forms without detracting or departing from the spirit and scope of the present invention. For example, and as shown in FIGS. 6 and 7, sleeve 14 can further define one or more receiving apertures 70 defining a closed margin 72 (FIG. 6) and disposed or located between the opposed ends 18 and 20 of sleeve 14. As used herein, the term or phrase "receiving aperture" is meant to include an opening, slot, hole, or other suitable form of recess. As illustrated schematically in FIG. 6, each receiving aperture 70 defined by sleeve 14 is of a predetermined length PL.

Tuning again to FIG. 7, the clip attachment portion 40 can include one or more radial projections 74 which are configured to fit within the receiving apertures 70 after the sleeve 14 is inserted into and compressed between the first and second sections 42 and 44, respectively, of the clip attachment portion 40. Notably, the radial projections 74 are of sufficient length to operably engage with the marginal edges 72 of the receiving apertures 70 but are sized to not detract from the inner surface 24 of the sleeve 14 grippingly engaging outer surface of the elongated member 12.

As illustrated in FIG. 6, the projections 74 have a predetermined length PL' which is equal in length to or less than the predetermined length PL of the receiving aperture 70 and defines a linear length of travel for the sleeve 14 relative to the clip 16. Accordingly, while sleeve 14 is permitted to linearly traverse such length of travel thereby facilitating securement of the clip fastening portion 30 relative to the support or connecting site 31, the cooperating instrumentalities 70, 72 on the sleeve 14 and clip attachment portion 40 serve to positively locate the elongated member 12, the sleeve 14 and clip 16 relative to each other. Moreover, and as will be appreciated, after the sleeve 14 is inserted and compressed between the first and second sections 42 and 44, respectively, of the clip attachment portion 40, the cooperating instrumentalities 70, 72 on the sleeve 14 and clip attachment portion 40 furthermore serve to limit rotational movement of the clip 16 about axis 13 of the elongated member 12.

Another form or embodiment of a clip assembly embodying principals of the present invention is illustrated in FIG. 8, This alternative form of clip assembly is designated generally by reference numeral 110. The elements of this alternative form of clip assembly that are identical or functionally analogous to those elements or components of the clip assembly 10 discussed above are designated by reference numerals identical to those used above with the exception this embodiment of the clip assembly uses reference numerals in the one-hundred series.

As shown in FIG. 8, clip assembly 110 is configured for attachment to an axially elongated tubular member 112 defining an elongated axis 113. Clip assembly 110 includes a sleeve 114 and a clip 116 arranged in operable combination relative to each other.

Sleeve 114 of clip assembly 110 is configured to fit about and grippingly engage an outer lengthwise portion of the elongated member 112. As illustrated in FIGS. 10 through 12, sleeve 114 has a predetermined length between its opposed ends 118 and 120. Sleeve 114 includes a bore or opening 122 which opens to the opposite ends 118, 120 and defines an inner surface 124 for sleeve 114.

In a preferred form, and to enhance the compressibility of the sleeve 114 about the elongated member 112, the inner surface 124 of sleeve 114 has an incomplete circular cross-section. That is, sleeve 114 preferably defines an open slit or groove 125 extending along the length thereof. In a most preferred embodiment, sleeve 114 furthermore defines a pair of confronting cam surfaces 128 and 130 for facilitating fitting sleeve 114 about and along an outer lengthwise portion of the elongated member 112.

The clip 116 of assembly 110 includes a fastening portion 130 and an attachment portion 140. As illustrated in FIG. 8, the fastening portion 130 is configured to attach the clip 116 to a fixed support or connecting site 131, i.e., an outer surface of a vehicle axle housing or the like. In this embodiment, the clip fastening portion 130 includes a resilient strap 133 having a generally circular configuration with two flexible limbs 135 and 137 which are positionable about the support 131. In the illustrated form, each flexible limb 135, 137 includes a series of teeth or serrations 139 disposed for intergagement relative to each other whereby permitting the clip 116 to be positioned and secured relative to the support 131.

As illustrated in FIGS. 8 and 13, the clip attachment portion 140 includes first and second sections 142 and 144, respectively, which combine with each other to define an opening 146 for accommodating and compressing the sleeve 114 therebetween. As shown, the first section 142 of the clip attachment portion 140 is connected to and extends from the clip fastening portion 130. The first and second sections 142 and 144, respectively, of the clip attachment portion 140 are joined together at respective first ends by hinge structure 148. As shown in FIG. 8, the hinge structure 148 preferably comprises a membranous member 149 for interconnecting the first and second sections 142 and 144, respectively, of the clip attachment portion 140 for relative movement. That is, the hinge structure 148 permits movement of the second section 142 of the clip attachment portion 140 from an open position, wherein respective second ends of the first and second sections 142 and 144, respectively, of the clip attachment portion 140 are relatively spaced from each other (FIG. 8), to a closed position. In the closed position (FIG. 13), the hinge structure 148 deforms to permit respective second ends of the first and second sections 142 and 144, respectively, of the clip attachment portion 140 to be moved relatively close to each other.

To maintain the first and second sections 142 and 144, respectively, of the clip attachment portion 140 in close relation relative to each other, the attachment portion 140 of the clip 116 further includes latch structure 151. As shown in FIG. 15, latch structure 151 preferably comprises a spring finger 156 extending from one of the sections 142, 144 of the clip attachment portion 140, and a catch 157 disposed on the other section 142, 144 of the clip attachment portion 140.

In the preferred embodiment, the spring finger 156 includes an arm 161 extending outwardly from section 144 of the clip attaching portion 140 and having a camming surface 163 with a locking lip 165 thereon. As illustrated in FIGS. 14 and 15, catch 157 includes an opening 167, generally rectangular in shape, in section 142 of the clip attaching portion 140 and a wall 169 including a camming surface 173 extending therefrom with a locking lip 175 thereon.

As illustrated in FIG. 15, in latching the first and second sections 142 and 144, respectively, of the clip attachment portion 140 in close relation relative to each other, the arm 161 of the spring finger 156 on the first second section 144 is inserted and received within the opening 167 in the first section 142. As the spring finger 156 moves into the opening 167, the carting surfaces 163 and 173 cooperate relative to each other to resiliently urge the finger 156 past the catch 157. As will be appreciated, further insertion of the spring finger 156 within the opening 167, and after the locking lip 165 on finger 156 moves past the locking lip 175 within the opening 167, the resiliency of arm 161 causes spring finger 156 to return to its normal position whereafter the confronting locking lips 165, 175 maintain the first and second sections 142, 144, respectively, of the clip attachment portion 149 in closed relationship relative to each other.

As with the first embodiment, a salient feature of the present invention relates to providing the sleeve 114 and the clip attachment portion 140 with cooperating instrumentalities which relate relative to each other after the sleeve 114 is inserted and compressed between the first and second sections 142 and 144, respectively, of the clip attachment portion 140 to limit movement of the sleeve 114 and the clip 116 thereby providing a positive locating feature between the elongated member 112, the sleeve 114, and the clip 116.

One form of the cooperating instrumentalities on the sleeve 114 and the clip attachment portion 140 for positively locating the elongated member 112, the sleeve 114, and the clip 116 relative to each other is shown in FIGS. 9 through 12 and 16. As shown, an outer surface of sleeve 114 is furthermore provided with a radial projection 163 disposed to one side of the opening 122 and between the opposed ends 118 and 120 of sleeve 114. In the exemplary embodiment, sleeve 114 further defines another radial projection 173 disposed to an opposite side of the opening 122 defined by sleeve 114.

Preferably, the radial projections 163, 173 on the outer surface of the sleeve 114 are substantially similar and, thus, a detailed description of only radial projection 163 will suffice for an understanding of both radial projections 163 and 173. As shown in FIG. 10, the radial projection 163 has a predetermined length PL less than the predetermined length of the sleeve 114 measured between opposed ends 118 and 120. Accordingly, and as shown, the predetermined length PL of the projection 163 is that distance measured between a pair of linearly spaced radial shoulders 165 and 167 extending between the outer surface of the sleeve 114 and the radial outermost edge of the projection 163.

As illustrated in FIGS. 14 and 16, the opening 146 defined by the clip attachment portion 140 of clip 116 defines a recess 171 configured with a diameter suitable to receive the radial projections 163 and 173 on the outer surface of the sleeve 114 therewithin. The recess 171 has a predetermined length PL' less than the length of opening 146 defined by sleeve 114. Accordingly, and as shown, the predetermined length of the recess 171 is that distance measured between a pair of linearly spaced radial shoulders 175 and 177 extending between the outer diameter of the opening 146 and the outer diameter of the recess 171.

As shown in FIG. 16, the predetermined length PL of the radial projection on the sleeve 114 is equal to or less than the predetermined length PL' of the recess 171 defined by the clip attachment portion 140 of the clip 116. Accordingly, any difference between the predetermined length of the radial projection 163 on the sleeve 144 and the predetermined length PL' of the recess 171 defines a linear length of travel for the sleeve 114 relative to the clip 116. In the exemplary embodiment illustrated in FIG. 16, and while the linear length of travel for the sleeve 114 relative to the clip 116 may be limited, the projections 163, 173 received within the recess 171 readily allow for rotational movements of the clip about the sleeve 114. Accordingly, the ability to rotate the clip 116 relative to the sleeve 114 facilitates securement of the clip fastening portion 130 to the support or connecting site 131, and the cooperating instrumentalities on the sleeve 114 and clip attachment portion 140 serve to positively locate the elongated member 112, the sleeve 114, and the clip 116 relative to each other. Of course, with relatively simple design changes to either the projections 163, 173 or the recess 171, rotational movements of the clip relative to the sleeve 114 can also be restricted or limited thereby also serving to positively locate the elongated member 112, the sleeve 114, and the clip 116 relative to each other.

In summary, the present invention facilitates the securing of an elongated member to a support by use of a clip assembly which is designed to permit limited relative movement between the components thereof under a relative low force or load (i.e., less than 10 lbs.) thereby facilitating securement of the fastening portion of the clip to the support or attachment site while the cooperating instrumentalities on the sleeve and attachment portion of the clip maintain a positive locating feature between the elongated member, the sleeve, and the clip. As will be appreciated, in either embodiment of the invention, the sleeve can be manually inserted onto the elongated member or automatically inserted thereon. Alternatively, the sleeve can be insert molded or overmolded to the elongated member.

As will be appreciated from an understanding of the present invention, and with either embodiment, the attachment portion of the clip exerts a compressive force against the sleeve such that the inner surface of the sleeve grippingly engages the outer surface of the elongated member to establish an interference fit between the clip assembly and the elongated member. That is, with either embodiment of the invention, the attachment portion of the clip exerts a compressive force against the sleeve such that the inner surface of the sleeve grippingly engages the outer surface of the elongated member with a relatively high (i.e. more than 15 lbs.) axial engagement force thereby enhancing the holding and support abilities of the clip assembly. As will be appreciated, the axial holding force applied to the outer surface of the elongated member can be readily changed by increasing or decreasing the length of the sleeve forming part of the present invention.

This invention provides a clip assembly for supporting an elongated member which can operably coupled to the clip assembly without requiring use of special tools for assembly. The clip assembly, therefore, readily lends itself particularly well to applications where access is restricted. It should be appreciated, however, there may be other applications where the ease of assembly will be found desirable even when access is less severely restricted.

From the foregoing it will be readily appreciated and observed that numerous modifications and variations can be effected without departing from the true spirit and scope of the novel concept of the present invention. It will be appreciated that the present disclosure is intended to set forth an exemplification of the present invention which is not intended to limit the invention to the specific embodiment illustrated. The disclosure is intended to cover by the appended claims all such modification and colorful variations as fall within the spirt and scope of the claims.

What is claimed is:

1. A clip assembly configured for attachment to an axially elongated tubular member in a manner limiting axial lengthwise movements of said clip assembly relative to said elongated member, said clip assembly comprising:

a hollow sleeve configured to fit about and grippingly engage an outer lengthwise portion of said elongated tubular member, said sleeve being adapted and configured to be positionable along the length of said elongated tubular member when fitted about said elongated tubular member;

clip having a fastening portion and an attachment portion, with said fastening portion of said clip being configured to attach said clip to a support, and with said attachment portion of said clip including first and second sections which combine with each other to define an opening for accommodating and compressing said sleeve therebetween, said clip being adapted and configured to apply the only outside compressive force to said sleeve to effectively position said sleeve on said elongated tubular member; and wherein said sleeve and the attachment portion of said clip define cooperating instrumentalities which relate to each other, after said sleeve grippingly engages said elongated tubular member and after said sleeve is inserted and compressed between said first and second sections of the attachment portion of said clip, to permit and control axial movement between said sleeve and said clip so as to allow said clip to be adjustably positioned relative to the support and thereby providing a positive locating feature between said sleeve, said clip, and said elongated member.

2. The clip assembly according to claim 1 wherein said hollow sleeve defines an inner surface having an incomplete circular cross-section.

3. The clip assembly according to claim 2 wherein said hollow sleeve defines a pair of confronting cam surfaces for facilitating fitting said sleeve about and along said outer lengthwise portion of said elongated member.

4. The clip assembly according to claim 1 wherein said hollow sleeve is formed from a compressible, elastomeric material for reducing vibration transfer between said support and said elongated member.

5. The clip assembly according to claim 1 wherein said fastening portion of said clip includes a shaft portion defining a longitudinal axis and anti-retraction ribs disposed along said shaft portion and extending away from said longitudinal axis for restricting removal of said clip of from said support.

6. The clip assembly according to claim 1 wherein said first and second sections define a pair of resilient and free ended arms extending away from said fastening portion and which are disposed relative to each other to provide a generally C-shaped configuration to the attachment portion of said clip, and with the free ended arms terminating in a pair of opposed end portions which are slightly spaced apart from one another.

7. The clip assembly according to claim 1 wherein said first and second sections of the attachment portion of said clip are joined together at respective first ends by a hinge having an undeformed condition wherein the first and second sections of said attachment portion are in an open position in which second ends of said first and second sections are relatively spaced from each other, with the hinge being elastically deformable to a deformed condition wherein the first and second portions of said attachment portion are in a closed position in which the second ends of said first and second sections are relatively closed to each other.

8. The clip assembly according to claim 7 wherein said second ends of said first and second sections have structure for maintaining said first and second portions in said closed position.

9. The clip assembly according to claim 1 wherein said sleeve has opposed ends with a predetermined length therebetween, and wherein an outer surface of said sleeve is configured between opposed ends with a radial projection having a first length less than said predetermined length of said sleeve, and wherein the opening defined between said first and second sections of the attachment portion of said clip is configured with a recess for accommodating said radial projection on said sleeve, said recess having a second length, with the first length of said projection and the second length of said recess limiting axial movement between said sleeve and said clip and thereby providing a positive locating feature between said sleeve, said clip, and said elongated member.

10. The clip assembly according to claim 1 wherein the fastening portion of said clip includes a resilient strap having a generally circular configuration with two flexible limbs which are positionable about said support, with each flexible limb including a series of teeth disposed for interengagement relative to each other whereby permitting said clip to be positioned and secured relative to said support.

11. A clip assembly configured for attachment to an axially elongated tubular member in a manner limiting axial and rotation movements of said clip assembly relative to said elongated member, said clip assembly comprising:

a sleeve having an opening extending lengthwise therethrough, with said sleeve and said opening being configured such that an inner surface of said opening fits about and grippingly engages an outer lengthwise portion of said elongated tubular member, said sleeve being adapted and configured to be positionable along the length of said elongated tubular member when fitted about said elongated tubular member;

a clip having a fastening portion and an attachment portion, with said fastening portion of said clip being configured to attach said clip to a support, and with said attachment portion of said clip including first and second sections which combine with each other to accommodate and compress said sleeve therebetween, said clip being adapted and configured to apply the only outside compressive force to said sleeve to effectively position said sleeve on said elongated tubular member; and wherein said sleeve and the attachment portion of said clip define cooperating instrumentalities which relate to each other, after said sleeve grippingly engages said elongated tubular member and after said sleeve is inserted and compressed between said first and second sections of the attachment portion of said clip, to permit and control axial and rotational movements between said sleeve and said clip so as to allow said clip to be adjustably positioned relative to the support and thereby providing a positive locating feature between said sleeve, said clip, and said elongated member.

12. The clip assembly according to claim 11 wherein said sleeve has an elongated generally C-shaped configuration.

13. The clip assembly according to claim 11 wherein said hollow sleeve is formed from a compressible, elastomeric material for reducing vibration transfer between said support and said elongated member.

14. The clip assembly according to claim 11 wherein the fastening portion of said clip includes a shaft portion defining an longitudinal axis and anti-retraction ribs disposed along said shaft portion and extending away from said longitudinal axis for restricting removal of said clip of from said support.

15. The clip assembly according to claim 11 wherein said first and second sections define a pair of resilient and free ended arms extending away from the fastening portion of said clip, and with the free ended arms defining a pair of confronting cam surfaces for facilitating fitting said sleeve therebetween.

16. The clip assembly according to claim 11 wherein said first and second sections of the attachment portion of said clip are joined together at respective first ends by a hinge having an undeformed condition wherein the first and second sections of said attachment portion are in an open position in which second ends of said first and second sections are relatively spaced from each other, with the hinge being elastically deformable to a deformed condition wherein the first and second portions of said attachment portion are in a closed position in which the second ends of said first and second sections are relatively closed to each other.

17. The clip assembly according to claim 16 wherein said second ends of said first and second sections include latching structure for maintaining said first and second portions in said closed position.

18. The clip assembly according to claim 11 wherein said sleeve has opposed ends with a predetermined length therebetween, and wherein an outer surface of said sleeve is configured between opposed ends with a radial projection having a first length less than said predetermined length of said sleeve, and wherein the opening defined between said first and second sections of the attachment portion of said clip is configured with a recess for accommodating said radial projection on said sleeve, said recess having a second length, and wherein said recess and said projection are each configured relative to the other to limit axial and rotational movement between said sleeve and said clip after said projection is accommodated within said recess thereby providing a positive locating feature between said sleeve, said clip, and said elongated member.

19. The clip assembly according to claim 11 wherein the fastening portion of said clip includes a resilient strap having a generally circular configuration with two flexible limbs which are positionable about said support, with each flexible limb including a series of teeth disposed for interengagement relative to each other whereby permitting said clip to be positioned and secured relative to said support.

20. The clip assembly according to claim 11 wherein said clip is formed from an elastomeric material selected from the group consisting of: nylon, plastic, and composite materials.

21. The clip assembly according to claim 1 wherein said sleeve has opposed ends with a predetermined length therebetween, said predetermined length of said sleeve being greater than a predetermined length of said clip, each of said opposed ends of said sleeve having a flange extending outwardly therefrom, said flanges limiting axial movement between said sleeve and said clip and thereby providing a positive locating feature between said sleeve, said clip, and said elongated member.

* * * * *